United States Patent Office 3,489,044
Patented Jan. 13, 1970

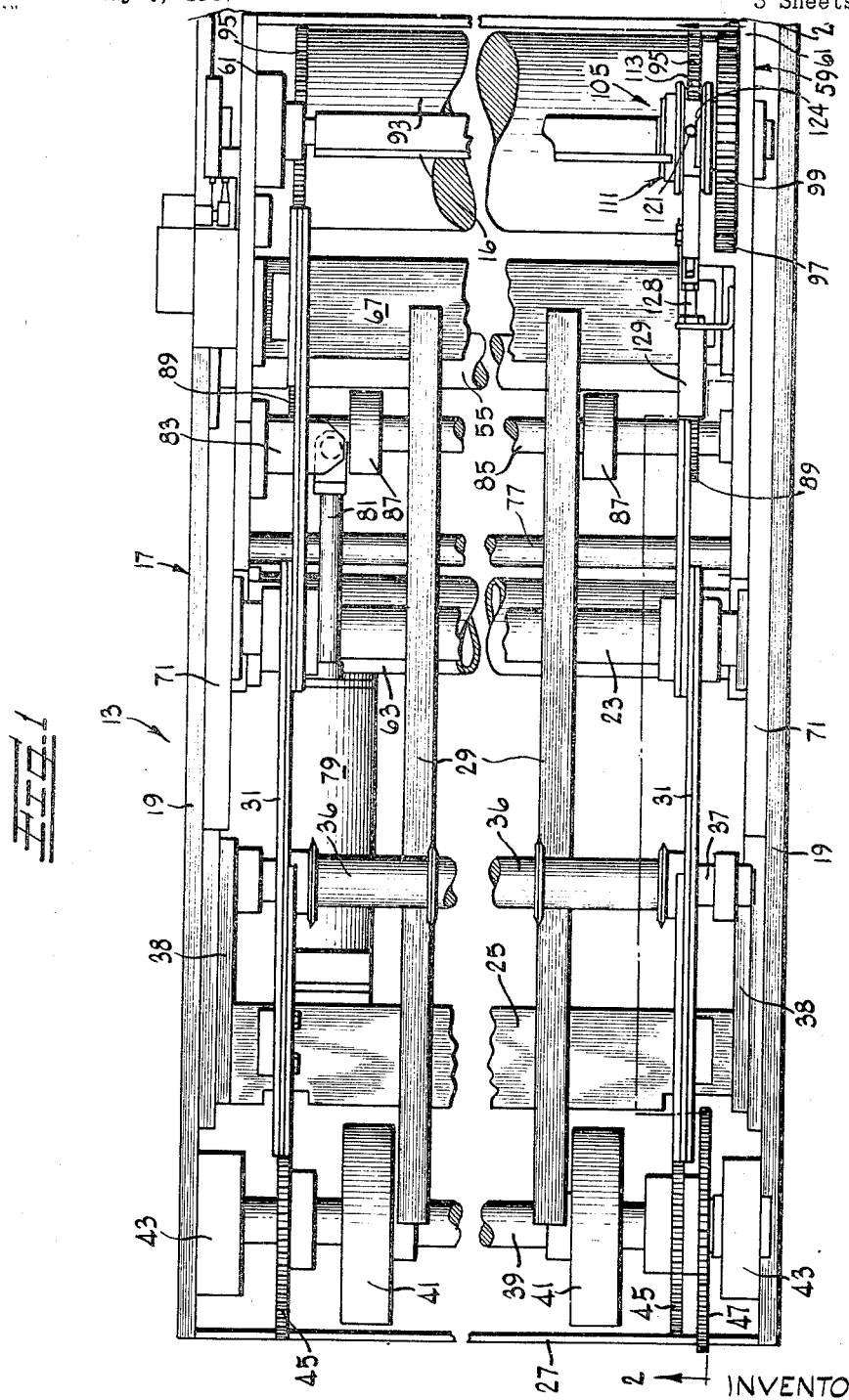

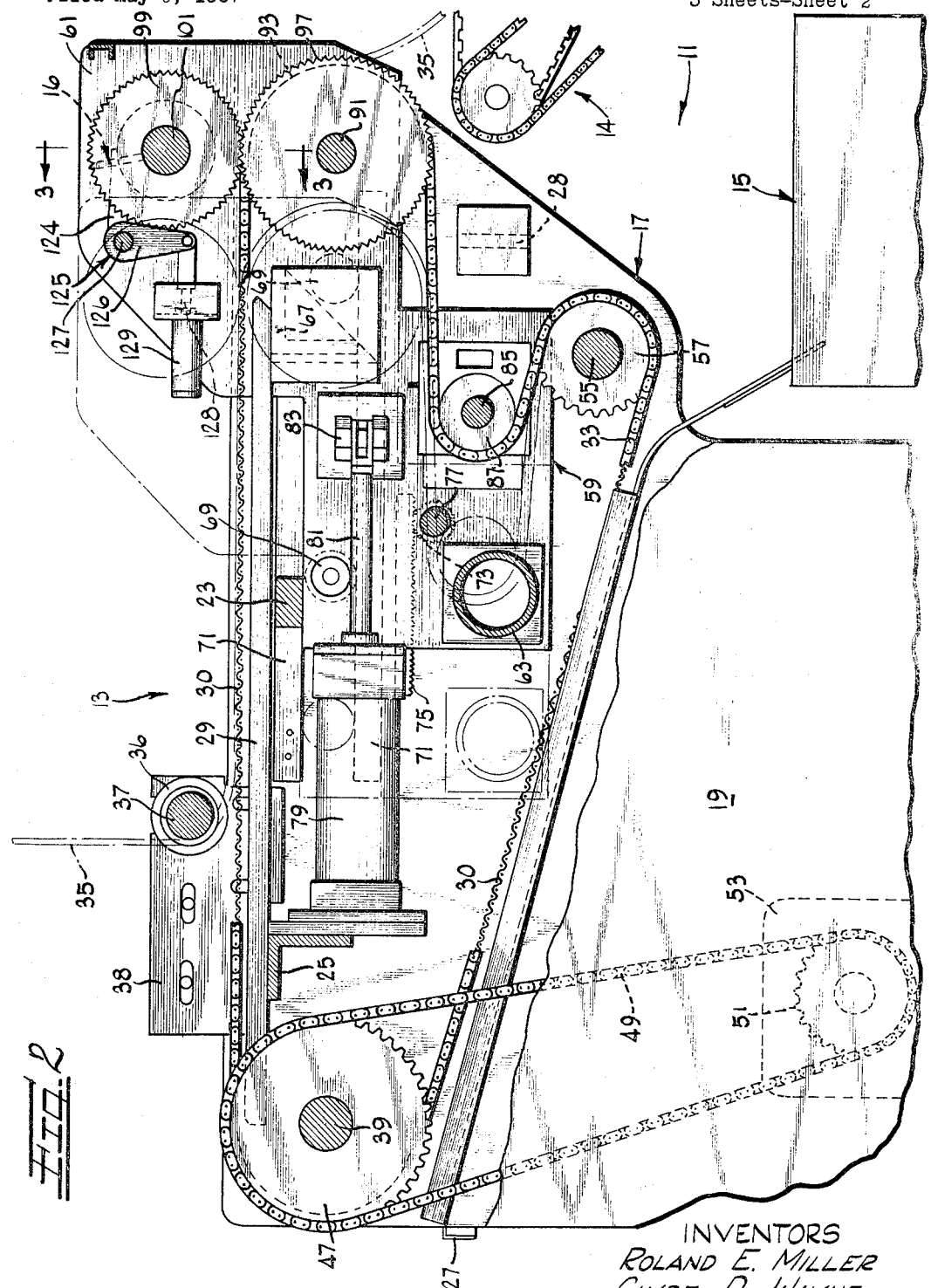

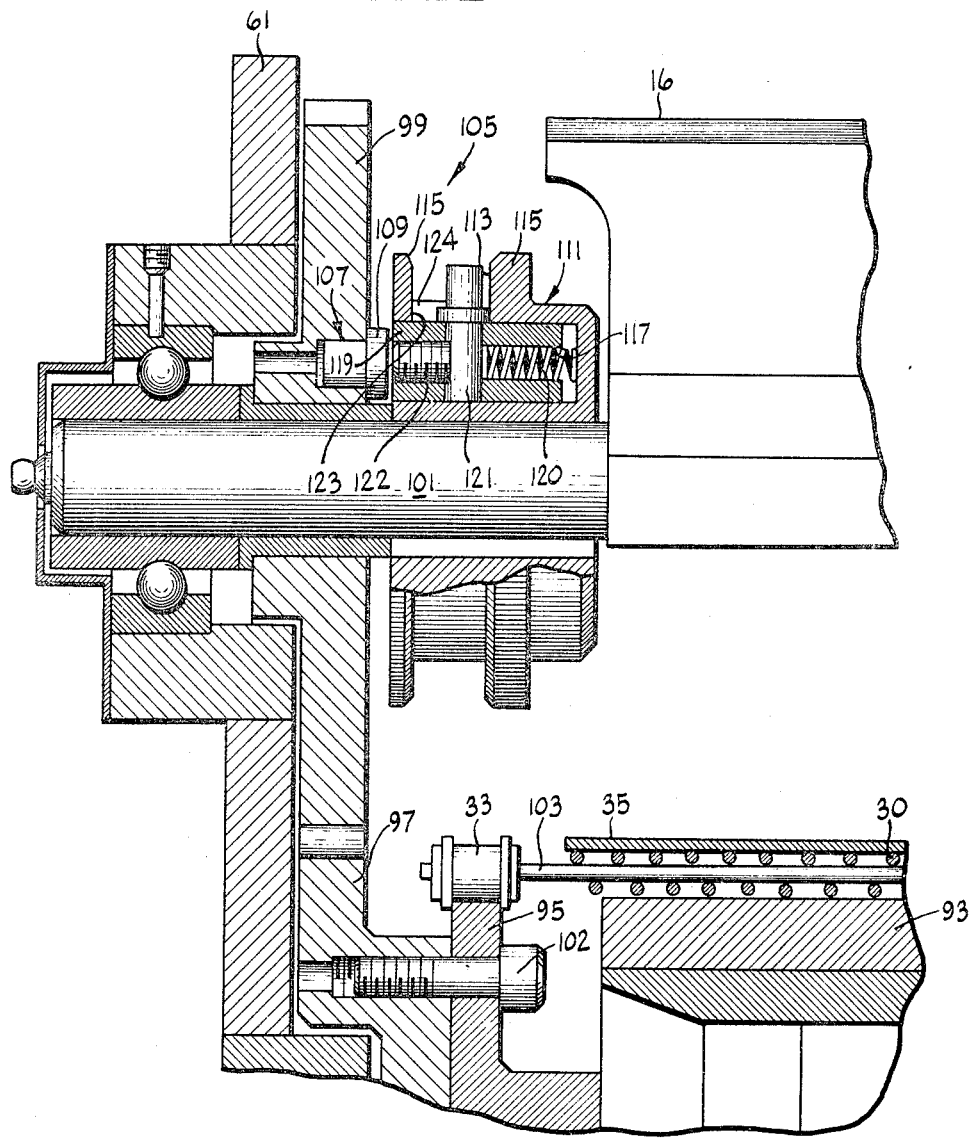

3,489,044
DISTRIBUTION METHOD AND SYSTEM
Roland E. Miller, Orangeville, Clyde D. Wayne, Wilmette, and Edgar C. Olson, Waukegan, Ill., assignors to National Dairy Products Corporation, Chicago, Ill., a corporation of Delaware
Filed May 5, 1967, Ser. No. 636,477
Int. Cl. B26d 7/06; B25g 47/30; B23d 25/02
U.S. Cl. 83—27                                        9 Claims

ABSTRACT OF THE DISCLOSURE

A method of distribution and conveyor system therefor in which material is received on a first conveyor for delivery to a second conveyor, at least one of the conveyors being shiftable relative to the other so as to create a gap between the conveyors into which material received by the first conveyor can be diverted.

---

This invention relates to conveyor systems and, more particularly, to conveyor systems adapted to temporarily divert the material conveyed out of the normal path of material flow.

In conveying material, including raw material as well as finished or partially finished items or products, it is frequently necessary to interrupt the flow of the material to the ultimate discharge station. For example, if the discharge station includes further processing equipment, flow must be interrupted whenever this equipment is temporarily shut down, as in the case of minor repairs. In certain situations, however, it is not convenient to shut down the equipment feeding the conveyor.

For example, in the production of sliced process cheese, it is customary to form molten cheese into a sheet which is passed around a refrigerated roll to be cooled and is then slit into ribbons. The ribbons are subsequently cut into slices which are then wrapped and packaged. The sheet forming equipment cannot easily be shut down and started up without considerable inconvenience. Accordingly, a problem is created when and if it becomes necessary to momentarily shut down the operation of the wrapping and packaging equipment.

It is a principal object of the present invention to provide an improved method of distribution and conveyor system therefor for temporarily diverting the material conveyed out of the normal path of material flow.

Other objects and advantages will become apparent with reference to the following description and the accompanying drawings. In the drawings:

FIGURE 1 is a fragmentary plan view of a portion of a conveyor system showing various of the features of the invention;

FIGURE 2 is a fragmentary sectional elevational view taken generally along the line 2—2 of FIGURE 1; and FIGURE 3 is an enlarged fragmentary sectional elevational view taken along line 3—3 of FIGURE 2.

Very generally, there is illustrated in the drawings a conveyor system 11 (FIG. 2) which constitutes a preferred embodiment of the present invention and which includes a receiving conveyor 13 adapted to continuously receive product from a source such as the chilled roll previously mentioned with reference to the manufacture of cheese. The conveyor 13 directs the material, such as cheese ribbons, toward and onto a discharge conveyor 14 which is positioned adjacent and at a slightly lower elevation than the discharge end of the conveyor 13. The conveyor 13 is constructed so as to enable its forward end to be retracted to create a gap or horizontal displacement between the conveyors through which material otherwise destined for the conveyor 14 can fall. An auxiliary conveyor 15 is positioned beneath the gap between the conveyors 13 and 14 and receives the material passing downwardly through the gap. For those situations in which the material is in the form of units of significant length which would be difficult to handle, e.g., ribbons of cheese, a cutting blade 16 is provided on the conveyor 13 to separate the units into segments.

More particularly, the receiving conveyor 13 comprises a frame 17 defined principally by a pair of horizontally spaced vertically disposed side walls 19 (FIG. 1) interconnected by cross braces 23, 25, 27, and 28 (FIGS. 1 and 2). The frame also includes horizontally disposed rails 29 carried on the upper surfaces of the cross braces 23 and 25 to support the mid-portion of the upper run of a conveyor screeen 30 (FIG. 2). Similarly mounted rails 31 (FIG. 1) are provided for supporting drive chains 33 disposed along each of opposite edges of the conveyor screen 30.

For one particular application of the system 11 in which material conveyed is in ribbon form, e.g., ribbons 35 of cheese shown in phantom in FIGURE 2 and in solid in FIGURE 3, the conveyor 13 includes guide rollers 36 above the upper run of the screen 35 to direct the ribbons in a predetermined manner onto the screen. The rollers 36 are flanged and are supported for free rotation on a shaft 37 whose axis is parallel to the upper run of the conveyor screen 30 and which spans the screen from one side to the other. The opposite ends of the shaft are supported in brackets 38 secured adjacent the upper ends of the side walls 19 in such a manner that their position along the length of the conveyor screen can be adjusted slightly if desired.

The screen 30 is supported on a series of horizontally extending shafts, all of which are rotatably mounted but some of which are stationary relative to the frame and others of which are movable relative to the frame to permit shifting of the leading edge of the screen. Thus, the rearward end of the conveyor screen is supported by means of a drive shaft 39 having screen-supporting rolls 41 affixed thereto at spaced positions along its length. The shaft 39 is rotatably mounted in bearings 43 secured to the side walls 19 and, in addition to the rolls 41, carries a pair of spaced sprockets 45 which receive the chains 33 of the conveyor screen 30. The shaft 39 also carries a drive sprocket 47 which receives a drive chain 49 connected to a drive sprocket 51 of a drive motor 53.

The conveyor screen 30 is continuous or loop-shaped and is supported adjacent the lower front end of the conveyor frame 17 by an idler shaft 55 which is rotatably carried at its opposite ends in bearings (not shown) secured to the side walls 19. The shaft 55, like the shaft 39, also has affixed to it screen-engaging rings (not shown) and, in addition, carries sprockets 57 which receive the chains 33 of the conveyor screen.

The remaining supporting shafts for the conveyor screen 30 are mounted on a carriage 59 which is mounted on the frame 17 for shifting movement forwardly and rearwardly, as shown by the full and phantom lines in FIGURE 2, to permit shifting of the leading edge of the conveyor screen, as previously noted. As seen best in FIGURES 1 and 2, the carriage 59 comprises a pair of side plates 61, each of which is positioned adjacent and parallel to one of the side walls 19. The side plates 61 are interconnected by a heavy hollow pipe 63 adjacent their lower rearward end, and by a cross brace 67 adjacent the forward end of the carriage.

Each carriage side plate 61 has a pair of horizontally spaced vertically aligned rollers 69 rotatably mounted on its outer surface, these rollers being received within a channel defined by vertically spaced parallel guide rails 71 secured to the inner surface of each frame side wall 19. Thus, the carriage rolls freely horizontally from front to rear. To insure that the carriage will roll straight, i.e., that it will not rack or twist relative to the conveyor frame as it rolls, a pair of pinion gears 73 are mounted one adjacent each side plate of the carriage and each engages one of a pair of racks 75. The pinion gears 73 are mounted on a common shaft 77 so that they will rotate in unison when the carriage is moved. Movement of the carriage is effected by an air cylinder 79 mounted on the frame 17 and having a piston rod 81 connected by means of a bracket 83 to one of the carriage side plates 61. Operation of the air cylinder is controlled by a valve (not shown) which is in turn electrically operated by a circuit (not shown) responsive to the operation of the remainder of the system such as, for example, a wrapping or packaging machine.

As previously mentioned, the carriage 59 also has mounted on it shafts for supporting the conveyor screen 30. In this regard, a shaft 85 is rotatably mounted adjacent the lower forward edge of the carriage side plates 61 and carries rings 87 to engage and support the conveyor screen. The shaft 85 is positioned so as to be located above and slightly rearwardly of the shaft 55 when the carriage is in its forwardmost position. Affixed adjacent each outer end of the shaft 85 is a sprocket 89 adapted to receive the chain 33 of the conveyor screen.

A second shaft 91 is rotatably mounted adjacent the forward edge of the carriage approximately midway of the height of the side plates 61, at approximately the same elevation as the shaft 39 which supports the rear end of the upper run, and carries a rubber covered drum 93 which the conveyor screen engages. Affixed adjacent each end of the shaft 91 is a sprocket 95 (FIG. 3) to receive one of the chains 33. In addition, one end of the shaft 91 carries a gear 97 which meshes with a gear 99 carried on a shaft 101 positioned above the shaft 91 and on which the cutting blade 16 is mounted, as hereinafter described. At the one end of the shaft, the sprocket 95 and gear 97 are interconnected by screws 102.

The conveyor screen 30 is preferably formed of woven metallic wire which is non-corrosive and suitable for food handling equipment. As seen in FIGURE 3, the screen has threaded through it at spaced intervals along its length rods 103 which are connected at their opposite ends to one of the chains 33. Thus, the driving connection between the chains 33 and the sprockets 47 of the rear drive shaft 39 also effects driving movement of the conveyor screen.

The upper run of the endless conveyor screen 30 overlies the rolls 41 of the rearward shaft 39 and the drum 93 of the forward shaft 91. It also overlies the support rails 29. Forwardly, the screen passes around the drum 93 and extends almost directly rearwardly horizontally over, down and around the rings 87 of the shaft 85 which, with the shaft 91, is mounted on the carriage 59 and movable therewith. The screen then passes forwardly over, down and around the rings (not shown) of the shaft 55, thence rearwardly and upwardly to the shaft 39. The chains 33 attached to the screen by the rods 103 follow a similar path around the sprockets of the respective shafts.

As can be seen by a comparison of the solid line and the phantom representation of the carriage in FIGURE 2, when the carriage is in its forwardmost position, as shown in solid lines, the drum 93, the surface of which defines roughly the forwardmost position of the conveyor screen 30, overhangs the rearward end of the conveyor 14. Thus, product such as cheese ribbons 35 leaving the conveyor screen at the forward end will fall directly onto the conveyor 14 and be carried away thereby. If the operation of the conveyor 14 is halted, however, as when the operation of the packaging machinery is interrupted, the air cylinder 79 is automatically actuated and withdraws the carriage to its rearwardmost position, which is shown in phantom in FIGURE 2. In this position, the drum 93 no longer overhangs the conveyor 14 but rather overhangs the auxiliary conveyor 15. In such a situation, any product which leaves the conveyor screen 30 will fall directly onto the conveyor 15 rather than upon the conveyor 14. This situation will prevail until the system is again operating in its entirety, at which point the air cylinder will return the carriage to its original position and the product will again be discharged onto the conveyor 14.

As previously mentioned, the cutting blade 16 is provided on the conveyor 13 so that when the carriage is retracted and the product, e.g., ribbons of cheese, is to be deposited onto the auxiliary conveyor 15, the product can be severed into more manageable pieces.

The cutting blade 16 is affixed to the shaft 101, previously referred to, which carries the gear 99 in meshing engagement with the gear 97 of the drum shaft 91. The gear 99 is not keyed to the shaft 101 but rather is coupled to the shaft by a clutch arangement 105 (FIG. 3). Thus, the gear 99 rotates continuously by virtue of its meshing engagement with the gear 97. The shaft 101, on the other hand, rotates only when the clutch 105 is engaged.

With reference to FIGURE 3, the clutch 105 includes a series of pegs 107 which are carried in holes which extend into the gear 99 inwardly of its inner face and parallel with its axis of rotation. (By "inner face" is meant that face of the gear adjacent the cutting blade 16.) The pegs 107 are circumferentially spaced an equal distance from one another and each is provided which a head 109 which projects outwardly from the inner face of the gear.

Affixed to the shaft 101 so as to rotate therewith adjacent the gear 99 is a clutch collar 111. The clutch collar is provided with a peripheral groove 113 bounded by radially directed horizontally spaced flanges 115. A passageway 117 extends inwardly into the clutch collar from that face which is adjacent the gear 99, the passageway being generally parallel to the rotational axis of the collar but spaced radially outwardly therefrom. Carried within the passageway is a plug 119 which is biased outwardly of the passageway by a spring 120 in such a manner that its outer end tends to engage the head 109 of one of the pegs 97 of the gear 99. Such engagement will, of course, cause the collar 111 and, hence, the shaft 101 to become coupled to and rotate with the gear.

The plug 119 carries a radially directed pin 121 which is held in place by a longitudinally extending set screw 122 and which projects outwardly of the passageway 117 through a radially directed axially extending slot 123 in the collar so that its outer end is positioned within the groove 113 of the collar. The pin 121 is free to move axially within the groove and, when so moved, urges the plug inwardly or outwardly of the collar in an axial direction into and out of engagement with the edges of the heads 109 of the pegs 107. Thus it will be seen that the plug 119, being normally biased outwardly of the collar 111, will effect the coupling of the collar and gear 99 so as to cause rotation of the collar and, thus, the shaft 101 and cutting blade 16 with the gear. When the pin 121 is moved within the slot of the groove 113 to the right as viewed in FIGURE 3, however, the plug is withdrawn from engagement with the peg 107, the collar and gear are no longer coupled, and the shaft 101 will no longer rotate with the gear.

Movement of the pin 121 within its groove in the channel 113 is effected by means of an arm 124 (FIG. 2) of a crank 125 pivotably mounted on a horizontally disposed shaft 127 positioned adjacent the gear 99. The other arm 126 of the crank 125 is connected to the outer end of a piston rod 128 of an air cylinder 129. The outer end of the crank arm 124 normally occupies the groove 113 of the clutch collar 111 and is positioned therein so as to urge the pin 121 to the right (FIG. 3) and thus maintain the plug 119 out of engagement with the pegs 107 of the gear 99. When the air cylinder 129 is actuated, however, so as to move the piston rod 128 forwardly, the crank arm 124 is raised out of engagement with the pin 121, which, because of the biasing effect of the spring 120, is urged with the plug 119 toward the left as seen in FIGURE 3, whereupon the plug engages a head 109 of one of the pegs 107. This couples the collar and the gear 99 and causes the shaft 101 to rotate and, along with it, the cutting blade 16, which will then commence cutting of the oncoming product such as cheese ribbons into predetermined lengths. In a preferred embodiment, the ribbons are cut into segments approximately 8½ inches in length. When the air cylinder 129 is again actuated to withdraw the piston rod 128 toward the left (FIGURE 3), the outer end of the crank arm 124 is brought down into the groove 113 of the collar and eventually engage the head of the pin 121 as the collar rotates. The outer end of the crank arm 124 is provided with a camming surface (FIGURE 2) which, when engaged by the pin 121, urges the pin toward the right (FIGURE 3), thereby retracting the plug 119 and disengaging the collar from the gear 99. The arm 124 also is provided with a shoulder which is engaged by the pin to prevent freewheeling of the shaft 101 and halt it in a desired position.

The operation of the air cylinder 129 is controlled by suitable valves (not shown) which are electrically operated with those valves (not shown) which control the operation of the cylinder 79. Thus, the shaft 101 will commence rotation as soon as the carriage 59 is retracted.

In operation, when a material such as ribbons 35 of cheese is delivered to the conveyor 13, the ribbons are guided around rollers 36 into overlying relation to the upper run of the conveyor screen 30. The conveyor screen is moving toward the right in FIGURE 2 and carries the ribbons toward the delivery end of the conveyor. Normally the ribbons will pass over the end of the conveyor 13 downwardly and onto the upper run of the conveyor 14.

If a delay or other difficulty should arise forwardly of the conveyor 13, necessitating a shutdown of some portion of the apparatus, e.g., the shutdown of a wrapping machine, the valves controlling the flow of fluid to the pneumatic cylinder are actuated, causing the piston rod 81 of that cylinder to be retracted, thereby moving the carriage 59 rearwardly so as to create a gap between the conveyors 13 and 14 sufficiently large to prevent relatively short segments of material leaving the conveyor 13 from engaging the conveyor 14. Simultaneously, the valve controlling the air cylinder 129 is actuated, causing the piston rod 128 of that cylinder to be extended, thereby lifting the arm 124 of the crank 125 and engaging the clutch 105 of the cutter blade 16. The shaft 101 carrying the cutter blade 16 will thus begin to rotate, causing the ribbons 35 to be cut into segments which will fall easily through the gap between the conveyors 13 and 14 and onto the conveyor 15 rather than bridge the gap.

When the units forwardly of the conveyor 13 again begin to operate, the valves controlling the cylinders 79 and 129 are again actuated to return the carriage 59 to its normal position and disengaging the clutch 105. The cutting blade 16 therefore ceases to rotate and the drum 93 which supports the forward edge of the conveyor screen 30 is once again in a position to guide the ribbons 35 onto the conveyor 14. The conveyor system thereafter performs in the same manner as it did before the shutdown occurred. The entire operation takes place automatically and it is not necessary for the operating personnel to handle the product in any way.

A conveyor system has thus been described illustrating an improved method and apparatus for temporarily diverting material conveyed out of the normal material flow. While the method and apparatus have been described with respect to one specific embodiment, it should be aparent that modifications can be made in that embodiment without departing from the scope of the invention.

Various of the features of the invention are set forth in the following claims.

What is claimed is:

1. A system for transporting at least one continuously produced endless ribbon along a predetermined path and for selectively diverting the ribbon from the path without ceasing production thereof, said system comprising a first conveyor defining a supporting surface adapted to receive and advance said endless ribbon, said supporting surface having an input end and a delivery end, a second conveyor defining a supporting surface having an input end normally positioned closely adjacent the delivery end of said supporting surface of said first conveyor to receive the ribbon therefrom and advance same, means responsive to a predetermined signal for effecting relative movement between the delivery end of said supporting surface of said first conveyor and the input end of said supporting surface of said second conveyor so as to create a gap therebetween of sufficient width to insure that segments of the ribbon of a predetermined length leaving the discharge end of said first conveyor will pass downwardly through the gap without passing onto said supporting surface of said second conveyor, means operative in response to said predetermined signal for engaging said ribbon before it reaches the discharge end of said supporting surface of said first conveyor and cutting said ribbon into segments of said predetermined length when said gap is created, and means disposed beneath said supporting surface of said first conveyor for receiving the segments passing through said gap.

2. A system in accordance with claim 1, wherein said means for effecting relative movement between the delivery end of said supporting surface of said first conveyor and the input end of said supporting surface of said second conveyor includes means for moving the delivery end of the supporting surface of said first conveyor away from the input end of said supporting surface of said second conveyor.

3. A system in accordance with claim 1, wherein said means for receiving segments passing through said gap comprises a third conveyor positioned beneath said gap.

4. A system in accordance with claim 1, wherein said means for cutting said ribbon into segments of said predetermined length are mounted on said first conveyor and cooperate with the supporting surface thereof.

5. A system in accordance with claim 1, wherein said means responsive to a predetermined signal for effecting relative movement between the delivery end of said supporting surface of said first conveyor and the input end of said supporting surface of said second conveyor so as to create a gap therebetween is also capable of effecting relative movement therebetween in the opposite direction in response to a subsequent predetermined signal to close said gap and restore said supporting surfaces to their normal relative position.

6. A system in accordance with claim 5, wherein said means for cutting said ribbon into segments is caused to cease operation in response to said subsequent predetermined signal.

7. A system in accordance with claim 5, wherein said means for cutting said ribbon into segments of said predetermined length comprises a cutting blade mounted for rotation about an axis disposed above and in generally parallel relation to said supporting surface of said first conveyor.

8. A system in accordance with claim 7, wherein a drive member is also mounted for rotation about the axis of rotation of said cutting blade, wherein means are provided to effect rotation of said drive member whenever said supporting surface is advanced, wherein a clutch is provided for coupling said cutting blade and said drive member, and wherein means are provided to engage said clutch in response to said predetermined signal and disengage said clutch in response to said subsequent predetermined signal.

9. In a system in which a continuously produced endless ribbon is transported along a predetermined path by means of a first conveyor having a discharge end and a second conveyor positioned adjacent the discharge end of the first conveyor to receive the ribbon therefrom, a method of diverting the ribbon from the predetermined path without ceasing production of the ribbon, said method comprising shifting at least a portion of one of the conveyors relative to the other to create a gap between the conveyors, and essentially simultaneously commencing a cutting of the ribbon into segments sufficiently small in length such that they will pass through the gap rather than pass onto the second conveyor.

References Cited

UNITED STATES PATENTS

| | | | |
|---|---|---|---|
| 1,789,822 | 1/1931 | Leguillon | 83—347 X |
| 2,704,148 | 3/1955 | Burrows. | |
| 2,938,474 | 5/1960 | Filler | 83—347 X |
| 3,106,280 | 10/1963 | Baker | 198—31 X |
| 3,150,761 | 9/1964 | Pinault et al. | 198—31 |
| 3,238,826 | 3/1966 | Crispe | 83—155 X |

WILLIAM S. LAWSON, Primary Examiner

U.S. Cl. X.R.

83—112, 155, 302; 198—31